(12) United States Patent
Jung et al.

(10) Patent No.: US 12,271,404 B2
(45) Date of Patent: Apr. 8, 2025

(54) SPATIAL LSM TREE APPARATUS AND METHOD FOR INDEXING BLOCKCHAIN BASED GEOSPATIAL POINT DATA

(71) Applicant: SOGANG UNIVERSITY RESEARCH FOUNDATION, Seoul (KR)

(72) Inventors: Sungwon Jung, Seoul (KR); Minjun Seo, Seoul (KR); Taehyeon Kwon, Goyang-si (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 190 days.

(21) Appl. No.: 17/861,847

(22) Filed: Jul. 11, 2022

(65) Prior Publication Data

US 2023/0195761 A1 Jun. 22, 2023

(30) Foreign Application Priority Data

Dec. 22, 2021 (KR) .......................... 10-2021-0184797

(51) Int. Cl.
*G06F 16/00* (2019.01)
*G06F 16/22* (2019.01)
*G06F 16/29* (2019.01)
*H04L 9/00* (2022.01)

(52) U.S. Cl.
CPC .......... *G06F 16/29* (2019.01); *G06F 16/2246* (2019.01); *G06F 16/2282* (2019.01); *H04L 9/50* (2022.05)

(58) Field of Classification Search
CPC .. G06F 16/29; G06F 16/2246; G06F 16/2282; G06F 16/9024; G06F 16/9027; G06F 16/2255; G06F 16/2272; G06F 16/235; H04L 9/50
See application file for complete search history.

(56) References Cited

U.S. PATENT DOCUMENTS

| 2016/0196677 | A1* | 7/2016 | Agrawal | G06F 16/248 345/440 |
| 2018/0373604 | A1* | 12/2018 | Martin | G06F 11/1451 |
| 2019/0073645 | A1* | 3/2019 | Dazin | G06Q 20/065 |
| 2021/0081396 | A1* | 3/2021 | Tian | G06F 3/061 |

FOREIGN PATENT DOCUMENTS

| KR | 10-1784612 B1 | 10/2017 |
| KR | 20210077975 A | * 6/2021 |

* cited by examiner

*Primary Examiner* — Dinku W Gebresenbet
(74) *Attorney, Agent, or Firm* — Paratus Law Group, PLLC

(57) ABSTRACT

A spatial LSM tree apparatus includes: a blockchain configured of a plurality of data blocks each storing point data distributed over an entire spatial area; a memory unit including a component table storing information about a memory component storing a first index of a most recently stored point data in the blockchain and all components of a spatial LSM tree indexing the point data to cover the entire spatial area; and a disk unit storing a secondary index for the point data in chronological order stored in the blockchain through a plurality of disk components formed in a hierarchical structure among a plurality of levels.

14 Claims, 6 Drawing Sheets

| Index | SLSM-tree Level | Key Range | Spatial Filter |
|---|---|---|---|
| 0 | 0 | 0, 63 | 1101 |
| 1 | 1 | 0, 15 | 1011 |
| 2 | 1 | 16, 31 | 1011 |
| 3 | 1 | 48, 63 | 0010 |
| 4 | 2 | 0, 3 | 1001 |
| 5 | 2 | 8, 11 | 0011 |

4-bit Spatial filter of Component A

| 0 | 0 | 0 | 1 |
|---|---|---|---|

(c)

Spatial filter for Component A after inserting $O_3$

| 1 | 0 | 0 | 1 |
|---|---|---|---|

SPATIAL LSM TREE APPARATUS AND METHOD FOR INDEXING BLOCKCHAIN BASED GEOSPATIAL POINT DATA

CROSS-REFERENCE TO RELATED APPLICATION

This application claims priority to and the benefit of Korean Patent Application No. 10-2021-0184797 filed on Dec. 22, 2021, which is hereby incorporated by reference in its entirety.

BACKGROUND

The present disclosure relates to geospatial data indexing technology, and more particularly, to a spatial LSM tree indexing technique that reduces I/O costs when inserting geospatial data in a blockchain environment by reflecting the write-intensive characteristics of a blockchain.

Recently, as blockchain technology has been grafted into various application fields, blockchain-based spatial information services are receiving a lot of attention. IBM has developed a blockchain-based food distribution information system that allows consumers to track all stages of delivery, and FOAM, a spatial blockchain system, developed a protocol that is capable of providing transaction services that combine blockchain addresses and geographic information. In addition, a UK university has developed a blockchain-distributed P2P to deliver data to drones and autonomous vehicles to respond to disasters. In addition, a blockchain is used in various fields that require reliability and openness. However, compared to the interest in the blockchain-based location information service, the search and analysis technique of geospatial data stored in the blockchain has not been studied much until now.

A blockchain has different characteristics from the environment assumed by the existing spatial database. First, a blockchain is a write-intensive environment that generates massive amounts of updates in real time. For example, in the case of Ethereum, one of the representative blockchains, transaction data is transmitted in the unit of blocks, and continuous updates occur at intervals of 14 to 15 seconds. Indexing methods such as R-tree used in various database systems have high index maintenance and update costs, which may cause a bottleneck phenomenon in an environment where updates are frequent. The second characteristic is the immutability of data. In principle, data stored in the blockchain cannot be deleted or changed. Accordingly, the size of the blockchain increases as the service continues, and it becomes increasingly difficult to manage the index of the database in memory.

Currently, searches for spatial information in many blockchains rely on secondary indexes of NoSQL DBMS. However, the secondary index of NoSQL requires repeated access to the primary index and disk of a system, so it is difficult to obtain sufficient performance improvement depending on the database.

RELATED ART DOCUMENT

Patent Document
   Korean Patent No. 10-1784612, Sep. 27, 2017

SUMMARY

An embodiment of the present disclosure is directed to providing a spatial LSM tree indexing technique that reduces I/O costs when inserting geospatial data in a blockchain environment by reflecting the write-intensive characteristics of a blockchain.

An embodiment of the present disclosure is directed to providing a spatial LSM tree apparatus and method for indexing blockchain based geospatial point data capable of avoiding searches on areas not associated with a query by linearizing the coordinates of spatial point data through geohash and arranging the same in a component of an LSM tree based on spatial proximity between the data.

Among the embodiments, the spatial LSM tree apparatus for indexing blockchain based geospatial point data includes: a blockchain configured of a plurality of data blocks each storing point data distributed over an entire spatial area; a memory unit including a component table storing information about a memory component storing a first index of a most recently stored point data in the blockchain and all components of a spatial LSM tree indexing the point data to cover the entire spatial area; and a disk unit storing a secondary index for the point data in chronological order stored in the blockchain through a plurality of disk components formed in a hierarchical structure among a plurality of levels, wherein the memory component and the plurality of disk components configure the spatial LSM tree and each has an independent data storage range and threshold value.

The component table may store a level, a key range, and a spatial filter for each component.

Each of the plurality of disk components may be implemented as a Z-order-based B-tree that stores a geohash value and a block address for the point data as the secondary index.

Each of the plurality of disk components may be spatially divided by a predetermined number and flushed to a lower level of the hierarchical structure when the number of data exceeds the threshold value during a storage process of the point data.

Each of the plurality of disk components may be merged with another component having the same key range at a corresponding level after the flushing.

The spatial filter may be implemented as a bit string indicative of a spatial distribution of point data stored in a corresponding component.

The spatial filter may be implemented as a bit string having a length corresponding to the number of divided partial space areas when a spatial area covered by the corresponding component is divided into a plurality of partial space areas. When the point data exists in a specific partial space area, a corresponding bit of the bit string may be expressed as 1 or otherwise expressed as 0.

Among the embodiments, the spatial LSM tree method for indexing blockchain based geospatial point data includes: receiving a plurality of pieces of point data each distributed over an entire spatial area; creating a new data block storing the plurality of pieces of point data; adding the new data block to a blockchain and indexing the plurality of pieces of point data into a spatial LSM tree covering the entire spatial area; flushing to a disk component when the number of data stored in a memory component exceeds a threshold value during the indexing process; and updating a component table based on a result of the flushing.

The indexing may include creating a geohash value and a block address for point data and storing the same in a component of the spatial LSM tree.

The flushing may include spatially dividing a spatial area covered by a component exceeding a threshold value by a predetermined number and then adding the same as lower-level components.

The flushing may include merging corresponding components when components having the same key range exist due to an addition of the lower-level components.

The flushing may include flushing to a same spatial area of a lower level without the spatial division when a current level of the component is equal to a preset limit level.

The flushing may include flushing recursively when the number of data stored in the disk component exceeds a threshold value.

The method may further include: receiving a range query regarding specific point data; performing a search on the range query using a spatial filter of the component table; and creating a response to the range query based on a result of the search.

Disclosed technology can have the following effects. However, it does not mean that a specific exemplary embodiment should include the entire following effects or should include only the following effects, and it should not be understood that the scope of right of disclosed technology is limited thereto.

The spatial LSM tree apparatus and method for indexing blockchain based geospatial point data according to an embodiment of the present disclosure can implement a spatial LSM tree, an index structure that supports a quick update to large capacity geospatial data stored in a blockchain by extending an LSM tree, which is an indexing technique for one-dimensional data.

The spatial LSM tree apparatus and method for indexing blockchain based geospatial point data according to an embodiment of the present disclosure can provide a spatial filter that minimizes I/O costs by eliminating unnecessary searches when querying point data search based on a spatial LSM tree.

DETAILED DESCRIPTION

Explanation of the present disclosure is merely an embodiment for structural or functional explanation, so the scope of the present disclosure should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a," "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

In each phase, reference numerals (for example, a, b, c, etc.) are used for the sake of convenience in description, and such reference numerals do not describe the order of each phase. The order of each phase may vary from the specified order, unless the context clearly indicates a specific order. In other words, each phase may take place in the same order as the specified order, may be performed substantially simultaneously, or may be performed in a reverse order.

The present disclosure may be implemented as machine-readable codes on a machine-readable medium. The machine-readable medium may include any type of recording device for storing machine-readable data. Examples of the machine-readable recording medium may include a read-only memory (ROM), a random access memory (RAM), a compact disk-read only memory (CD-ROM), a magnetic tape, a floppy disk, optical data storage, or any other appropriate type of machine-readable recording medium. The medium may also be carrier waves (e.g., Internet transmission). The computer-readable recording medium may be distributed among networked machine systems which store and execute machine-readable codes in a de-centralized manner.

The terms used in the present application are merely used to describe particular embodiments, and are not intended to limit the present disclosure. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Figure 1:
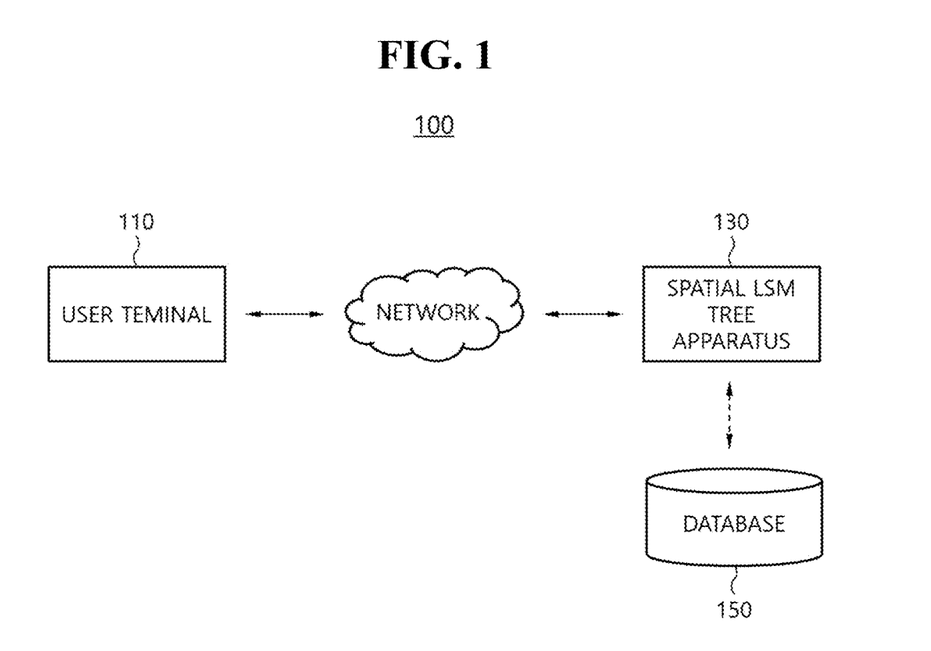
FIG. 1 is a diagram illustrating a spatial LSM tree system according to an embodiment of the present disclosure.

FIG. 1 is a diagram illustrating a spatial LSM tree system according to an embodiment of the present disclosure.

Referring to FIG. 1, a spatial LSM tree system 100 may include a user terminal 110, a spatial LSM tree apparatus 130, and a database 150.

The user terminal 110 may correspond to a computing apparatus that is connected to the spatial LSM tree apparatus 130 and may perform operations such as input and inquiry regarding geospatial point data. The user terminal 110 may be implemented as a smartphone, a notebook computer, or a computer, but is not limited thereto, and may be implemented in various devices such as a tablet PC. The user terminal 110 may be connected to the spatial LSM tree apparatus 130 through a network, and a plurality of user terminals 110 may be simultaneously connected to the spatial LSM tree apparatus 130.

The spatial LSM tree apparatus 130 may be implemented as a server corresponding to a computer or program that performs a spatial LSM tree method for indexing blockchain based geospatial point data according to an embodiment of the present disclosure. The spatial LSM tree apparatus 130 may be connected to the user terminal 110 through a wired or wireless network, and may exchange data with each other.

In an embodiment, the spatial LSM tree apparatus 130 may operate in conjunction with various external systems (or servers) in the process of performing the spatial LSM tree method for indexing blockchain based geospatial point data according to an embodiment of the present disclosure. In addition, the spatial LSM tree apparatus 130 may search for and provide point data satisfying the query condition among point data distributed over a specific spatial area as a response to the range query of a user.

The database 150 may correspond to a storage device for storing various types of information required in the operation process of the spatial LSM tree apparatus 130. For example, the database 150 may store information about geospatial point data, and may store information about a spatial LSM tree regarding point data, but is not necessarily limited thereto. The spatial LSM tree apparatus 130 may store information collected or processed in various forms while performing the spatial LSM tree method for indexing blockchain based geospatial point data according to an embodiment of the present disclosure.

Figure 2:
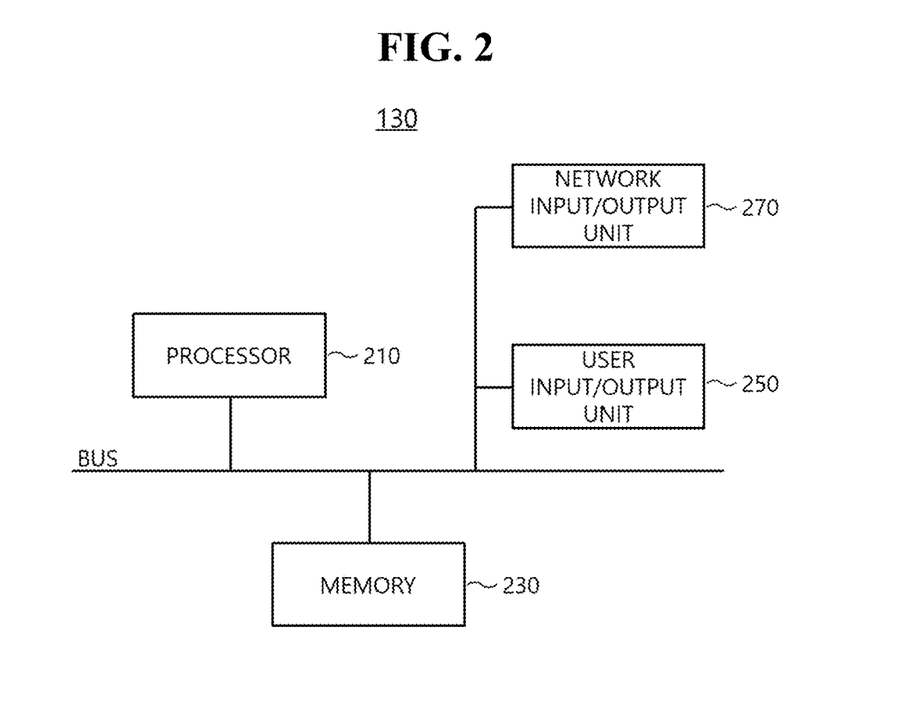
FIG. 2 is a diagram illustrating a system configuration of the spatial LSM tree apparatus of FIG. 1.

FIG. 2 is a diagram illustrating a system configuration of the spatial LSM tree apparatus of FIG. 1.

Referring to FIG. 2, the spatial LSM tree apparatus 130 may include a processor 210, a memory 230, a user input/output unit 250, and a network input/output unit 270.

The processor 210 may execute a spatial LSM tree procedure for indexing blockchain based geospatial point data according to an embodiment of the present disclosure, and may manage the memory 230 that is read or written in this process and schedule a synchronization time between a volatile memory and a nonvolatile memory in the memory 230. The processor 210 may control the overall operation of the spatial LSM tree apparatus 130, and is electrically connected to the memory 230, the user input/output unit 250, and the network input/output unit 270 to control data flow therebetween. The processor 210 may be implemented as a central processing unit (CPU) of the spatial LSM tree apparatus 130.

The memory 230 may be implemented as a non-volatile memory such as a solid state disk (SSD) or a hard disk drive (HDD) and may include an auxiliary memory device used to store overall data required for the space LSM tree apparatus 130, and may include a main memory device implemented as a volatile memory such as random access memory (RAM). In addition, the memory 230 may store a set of instructions for executing the spatial LSM tree method for indexing blockchain based geospatial point data according to an embodiment of the present disclosure by being executed by the electrically connected processor 210.

The user input/output unit 250 may include an environment for receiving a user input and an environment for outputting specific information to a user, and may include, for example, an input device including an adapter such as a touch pad, a touch screen, an on-screen keyboard, or a pointing device and an output device including an adapter such as a monitor or a touch screen. In an embodiment, the user input/output unit 250 may correspond to a computing device connected through a remote connection, and in such a case, the spatial LSM tree apparatus 130 may be performed as an independent server.

The network input/output unit 270 may provide a communication environment to be connected to the user terminal 110 through a network, and may include, for example, an adapter for communication such as a Local Area Network (LAN), a Metropolitan Area Network (MAN), a Wide Area Network (WAN), and a Value Added Network (VAN). In addition, the network input/output unit 270 may be implemented to provide a short-distance communication function such as Wi-Fi or Bluetooth or a wireless communication function of 4G or higher for wireless data transmission.

Figure 3:
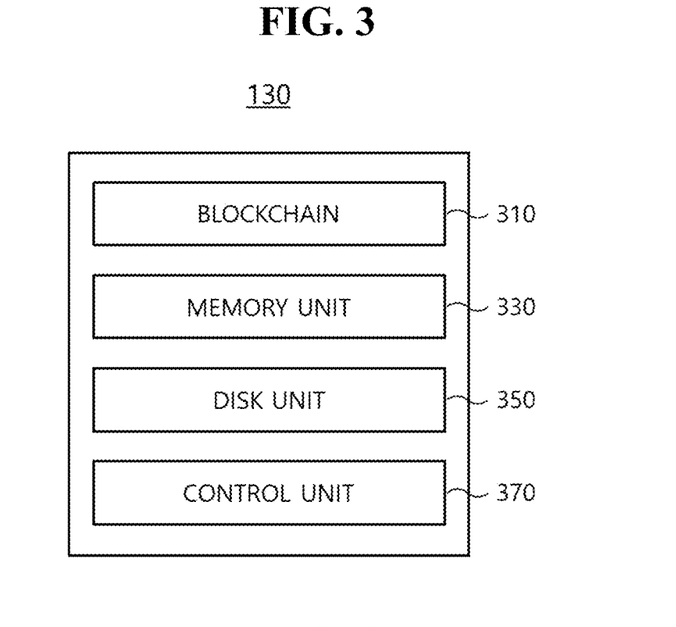
FIG. 3 is a diagram illustrating a functional configuration of the spatial LSM tree apparatus of FIG. 1.

FIG. 3 is a diagram illustrating a functional configuration of the spatial LSM tree apparatus of FIG. 1.

Referring to FIG. 3, the spatial LSM tree apparatus 130 may include a blockchain 310, a memory unit 330, a disk unit 350, and a control unit 370.

The blockchain 310 may be configured of data blocks that store data, and each data block may be connected in a chain form. In other words, when a new data block is created, the new data block may be connected to the most recently created data block and added to the blockchain 310. The blockchain 310 may serve to store geospatial point data, and may be stored in the database 150. In an embodiment, the blockchain 310 may be implemented as a separate and independent data management system, and in this connection, the blockchain 310 may operate in interconnection with the spatial LSM tree apparatus 130. In this connection, the control unit 370 of the spatial LSM tree apparatus 130 may control interlocking with each other.

In particular, the blockchain 310 may store and manage point data through a plurality of data blocks, and the point data may correspond to geospatial data distributed over the entire spatial area. In addition, the point data stored in the blockchain 310 may be indexed through a spatial LSM tree. In other words, the spatial LSM tree may correspond to an index structure that stores an index on point data stored in the blockchain 310. The spatial LSM tree may support quick update to large capacity geospatial data stored in the blockchain 310 by extending the LSM tree, which is an indexing technique for one-dimensional data. The spatial LSM tree may cover the entire spatial area by indexing point data distributed over the entire spatial area.

The memory unit 330 may be implemented by including a memory component that stores a first index of the most recently stored point data in the blockchain 310 and a component table that stores information about all components of the spatial LSM tree. In addition, the memory unit 330 may be implemented to operate in conjunction with the physical memory 230 of FIG. 2. The memory component may be stored and managed in the memory, and may correspond to one of the components configuring the spatial LSM tree. The memory component may store index information of the last point data stored in the blockchain 310. In other words, the first index may correspond to index information of the point data stored in the memory, and the point data may be indexed regardless of the location of the entire spatial area.

The component table may correspond to a table structure that stores a level, a key range, and a spatial filter for each component of the spatial LSM tree. The component table may serve to provide information about data distribution during query processing in the spatial LSM tree. Here, the level may correspond to a stage in which the component exists, the key range may correspond to a range in which each component may store point data, and the spatial filter may correspond to data indicative of a spatial distribution of point data stored in the component.

In an embodiment, the spatial filter may be implemented as a bit string indicative of a spatial distribution of point data stored in a corresponding component. In an embodiment, the spatial filter may be implemented as a bit string having a length corresponding to the number of divided partial space areas when a spatial area covered by the corresponding component is divided into a plurality of partial space areas. When the point data exists in a specific partial space area, the corresponding bit of the bit string may be expressed as 1 or otherwise expressed as 0. For example, in the case of 4 division, the bit string may be implemented with a length of 4 bits. The same will be described in more detail with reference to FIG. 9.

The disk unit 350 may store a secondary index for the point data in chronological order stored in the blockchain through a plurality of disk components formed in a hierarchical structure among a plurality of levels. The disk unit 350 may be implemented to operate in conjunction with the physical database 150 of FIG. 1. The disk component may be stored and managed in the disk, and may correspond to one of the components configuring the spatial LSM tree. The disk component may store index information of point data sequentially stored in the blockchain 310.

In addition, unlike a singly implemented memory component, the disk component may be implemented in a plural number. In particular, the disk component may be disposed on a plurality of levels to form a hierarchical structure. In this connection, the plurality of levels may be determined according to the size of a space area covered by the corresponding disk component. For example, when the entire space area is spatially divided into four quadrants, a disk component covering each quadrant area may be disposed on level 1, and when the area covered by the disk component disposed on level 1 is spatially divided into four areas again, the disk component covering the divided areas may be disposed on level 2.

As the level of the hierarchical structure increases, the size of the space area covered by the disk component may decrease, but at a level exceeding a preset limit level, the size of the space area may no longer become smaller and may remain the same.

In an embodiment, each of the plurality of disk components may be implemented as a Z-order-based B-tree that stores a geohash value and a block address for the point data as the secondary index. Here, the geohash value may correspond to a bit string in which (x, y) pair of coordinate information is expressed as a Z-ordering-value to express two-dimensional point data in one dimension, and the block address may correspond to the address of a data block in which information is stored in the blockchain 310.

In other words, each component configuring a spatial LSM tree may be implemented as a structure that stores point data through a Z-order-based B-tree, and may store pair information of a block address and a geohash value s index information for indexing point data stored in the blockchain 310. In other words, the secondary index may correspond to index information of point data stored in the disk. Point data stored in the Z-order-based B-tree may be aligned based on a geohash value.

In an embodiment, each of the plurality of disk components may be spatially divided by a predetermined number (for example, four) and flushed to a lower level of the hierarchical structure when the number of data exceeds a threshold value during a storage process of point data. Each component of the spatial LSM tree may be defined including a data storage range and a threshold value, and the disk component may distribute the point data to lower-level disk components that form a hierarchical structure through a flush operation when the number of data exceeds a threshold value in the process of storing the point data.

In this connection, the flush operation may be performed in a unit of a component, and a space area covered by a disk component may be divided into a predetermined number (for example, four) of partial space areas. In this connection, only an area in which point data is distributed among the divided partial space areas may be added as a lower-level disk component. Accordingly, the number of disk components added to a lower level according to the flush operation may be dynamically determined from the minimum of one to the maximum number of divisions (for example, four in the case of four divisions).

In an embodiment, each of the plurality of disk components may be merged with another component having the same key range at a corresponding level after flushing. Disk components may be added to a lower level of the hierarchical structure according to the flush operation, and the continuous increase of components and the division of storage spaces due to the flush operation will increase the search time and decrease the query speed due to I/O increase during query processing. Accordingly, an operation of merging components having the same key range among components belonging to the same level into one component may be performed after the flush operation.

The control unit 370 may control the overall operation of the spatial LSM tree apparatus 130, and may manage a control flow or data flow among the blockchain 310, the memory unit 330, and the disk unit 350.

Figure 4:
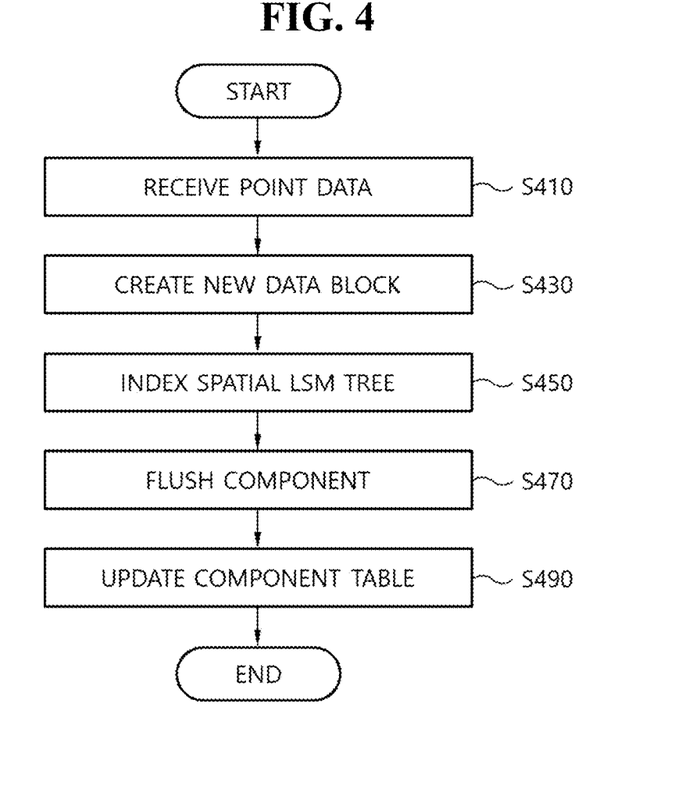
FIG. 4 is a flowchart illustrating a spatial LSM tree method for indexing blockchain based geospatial point data according to an embodiment of the present disclosure.

FIG. 4 is a flowchart illustrating a spatial LSM tree method for indexing blockchain based geospatial point data according to an embodiment of the present disclosure.

Referring to FIG. 4, the spatial LSM tree apparatus 130 may receive a plurality of pieces of point data each distributed over the entire spatial area (stage S410). The spatial LSM tree apparatus 130 may create a new data block storing a plurality of pieces of point data (stage S430). The spatial LSM tree apparatus 130 may add a new data block to the block chain 310 and index a plurality of pieces of point data into the spatial LSM tree covering the entire spatial area (stage S450).

In addition, the spatial LSM tree apparatus 130 may flush to a disk component when the number of data stored in a memory component exceeds a threshold value during an indexing process (stage S470). In this connection, the flush operation may be repeatedly performed according to a hierarchical structure. The spatial LSM tree apparatus 130 may update a component table based on a result of the flushing (stage S490).

In an embodiment, the spatial LSM tree apparatus 130 may perform a search on a range query using a spatial filter of the component table when receiving the range query on specific point data from the user terminal 110. In other words, the spatial LSM tree apparatus 130 may reduce unnecessary searches during a response creation process through the spatial filter. The spatial LSM tree apparatus 130 may create a query response related to the range query according to a search result, and may provide the query response to the user terminal 110.

Hereinafter, a spatial LSM tree apparatus and method for indexing blockchain based geospatial point data according to an embodiment of the present disclosure will be described in more detail with reference to FIGS. 5 to 10.

Figure 5:
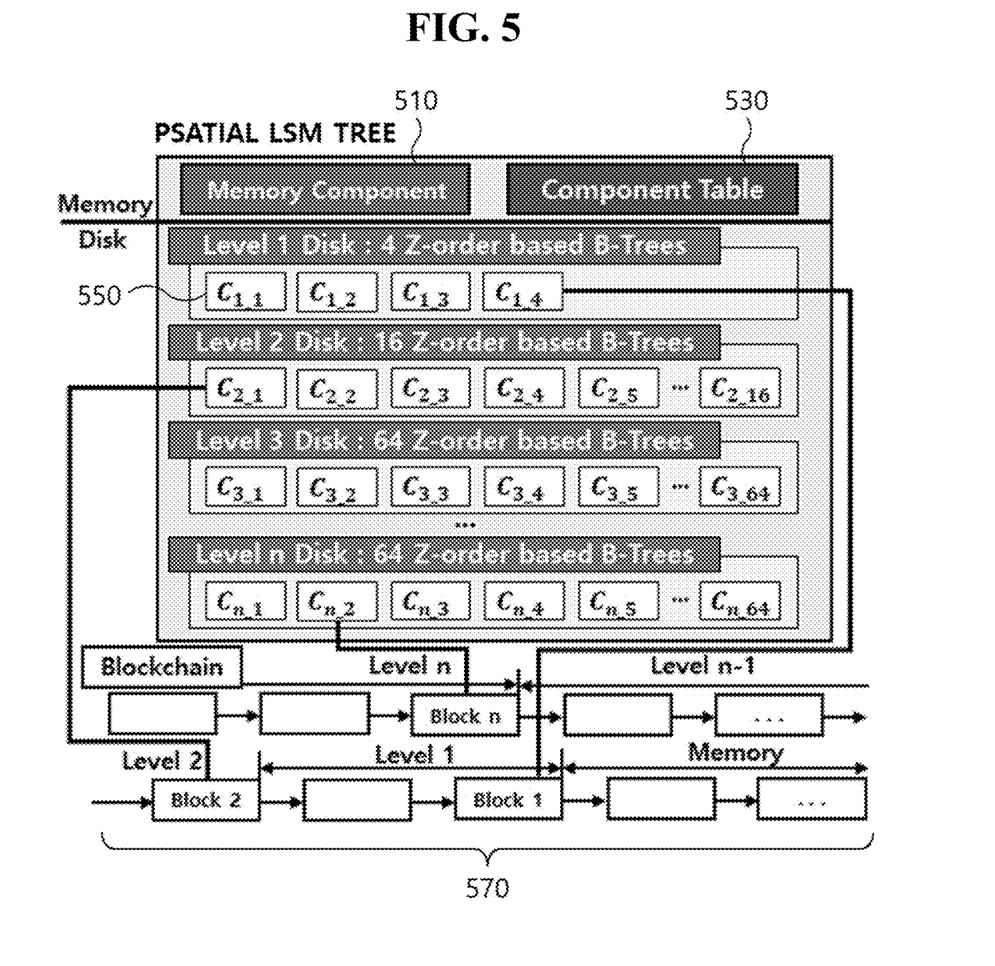
FIG. 5 is a diagram illustrating an embodiment of a spatial LSM tree structure according to an embodiment of the present disclosure.

Referring to FIG. 5, the spatial LSM tree may correspond to an indexing technique that reduces I/O costs when inserting geospatial data in a blockchain environment by reflecting the write-intensive characteristics of the blockchain (570).

More specifically, the spatial LSM tree may store one memory component 510 and a component table 530 in a memory area, and store a disk component 550 in a disk area. In this connection, the memory area may correspond to the memory 230 of FIG. 2, and the disk area may correspond to the database 150 of FIG. 1.

First, the memory component 510 may correspond to a component of the highest level having an index of the most recently stored point data in the blockchain 570. The disk component 550 may store the point data in chronological order stored in the blockchain, the latest data may be stored in Level 1, and the oldest data may be stored in Level n.

Figure 6:
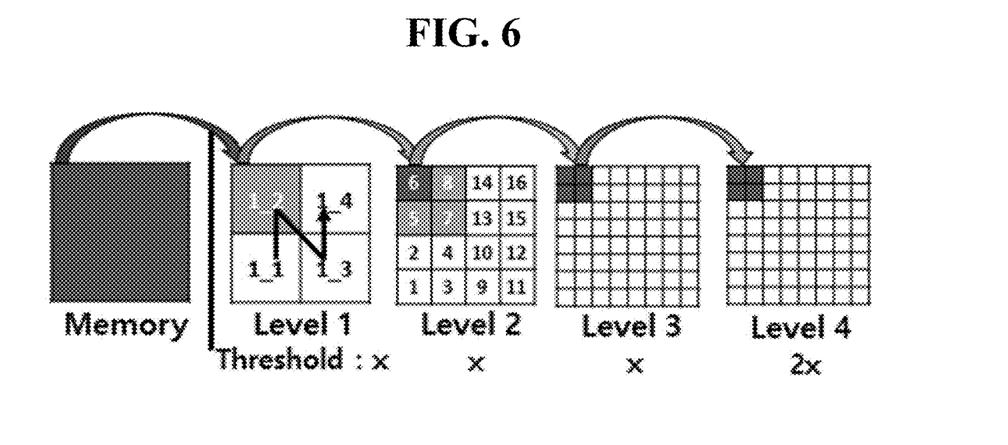
FIG. 6 is a diagram illustrating the number of components and threshold values for each level according to an embodiment of the present disclosure.

In addition, each of the components 510 and 550 may have a data storage range and a threshold value as shown in FIG. 6. For example, the memory component 510 may store point data regardless of a location, and may have a threshold value of x. In addition, the disk component 550 of Level 1 may have a range in which the area of the memory component 510 is spatially divided into four quadrants of NW, NE, SW, and SE, for example, 1_1 may correspond to SW, 1_2 may correspond to NW, 1_3 may correspond to SW, and 1_4 of FIG. 6 may correspond to NE. In addition, $C_{1\_2}$ of FIG. 5 may have the same range as 1_2 of Level 1 of FIG. 6. When the disk component 550 of Level 1 exceeds a threshold value, the disk component 550 of Level 2 may also be divided into four areas and stored in Level 2. For example, when $C_{1\_2}$ of FIG. 5 exceeds the threshold value x, the disk component 550 may be divided into four areas and stored in $C_{2\_5}$, $C_{2\_6}$, $C_{2\_7}$, and $C_{2\_8}$, respectively, and may correspond to 2 to 5, 6, 7 and 8 in Level 2 of FIG. 6, respectively.

However, continuous increase of components and division of storage spaces may increase search time and decrease query speed due to I/O increase during query processing. Accordingly, it is possible to prevent the continuous increase of components by limiting the increase of components and spatial division at a specific level as shown in FIG. 6, and by doubling the threshold value of the component from the level at which the division is limited. In this connection, the limited level may be flexibly adjusted according to the size of data. For example, in the case of FIG. 6, the limitation level may be set to 3, and accordingly, only the threshold value may increase from x to 2x while the number of components is the same in levels 3 and 4 of FIG. 6.

Figure 7:
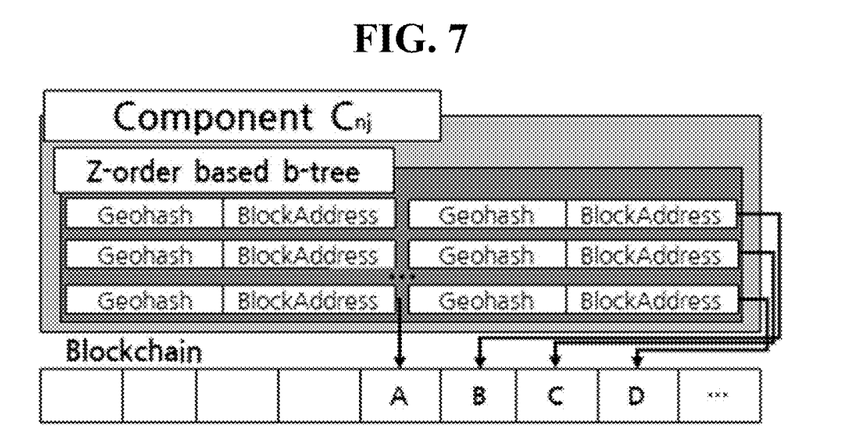
FIG. 7 is a diagram illustrating a structure of a component according to an embodiment of the present disclosure.

Referring to FIG. 7, the component may correspond to a structure that stores point data through a Z-order based B-Tree, and may store the data in the form of (Geohash, BlockAddress) and align the same based on a geohash value. The geohash may correspond to a bit string in which (x, y) pair of coordinate information is calculated as a Z-ordering-value to represent two-dimensional point data in one dimension, and the block address may correspond to an address of the block in which information is stored in the blockchain. When accessing the data of each component, after finding the geohash value of the corresponding point data, the block in which the data is stored may be accessed by referring to the corresponding block address.

Figure 8:
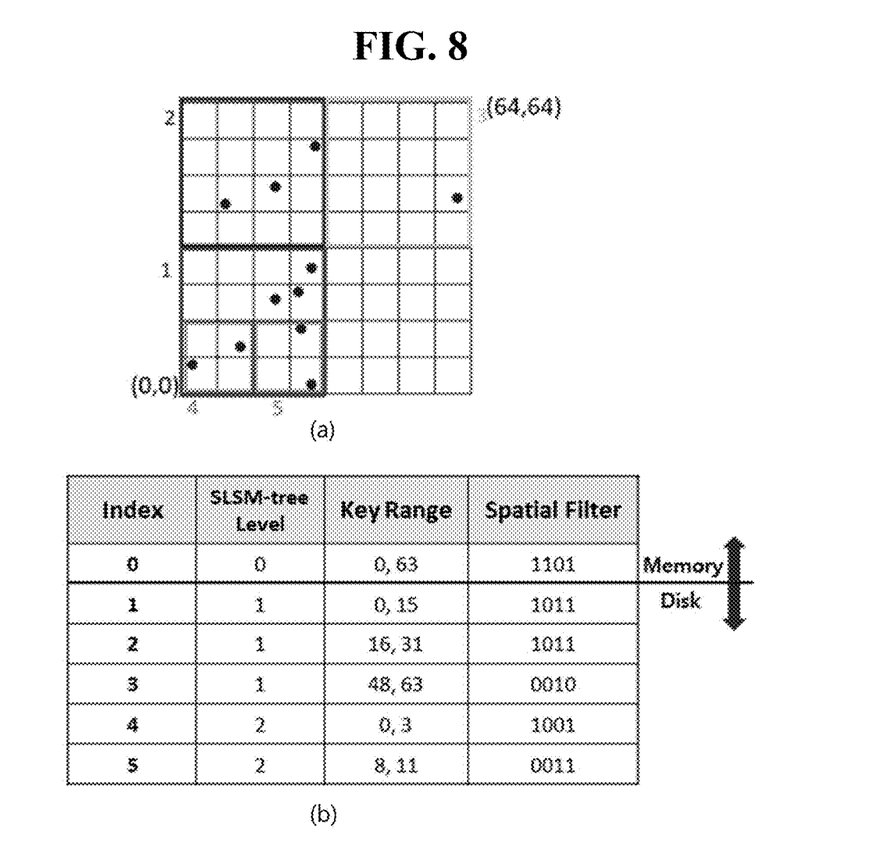
FIG. 8 is a diagram illustrating an embodiment of a component table according to an embodiment of the present disclosure.

Referring to FIG. 8, the component table (FIG. 8(B)) may be managed in the memory 230, and information on all components configuring the spatial LSM tree may be stored. In other words, it is possible to reduce I/O costs and make quick queries possible by eliminating unnecessary component searches during query processing through the information stored in the component table.

In addition, the component table may store a level, a key range, and a spatial filter of a component. A level is a stage in which a component exists, and a key range may correspond to a range in which each component may store point data. In FIG. 8, since the memory component stored as Index 0 has a key range corresponding to the entire space, point data may be stored regardless of a location. The disk component of Level 1 may have a key range such as 0-15 or 16-31 which divides the entire data space into quarters. Similarly, the disk component of Level 2 may have a key range such as 0-3 or 8-11, which is one of the disk components of Level 1 divided into quarters, that is, which divides the entire area into 16 divisions.

For example, FIG. 8(A) is an example of displaying the data stored in each component, and FIG. 8(B) may correspond to the component table when the spatial LSM tree is given as in FIG. 8(A). Accordingly, it is possible to check the data distribution through the component table during query processing in the spatial LSM tree.

Figure 9:
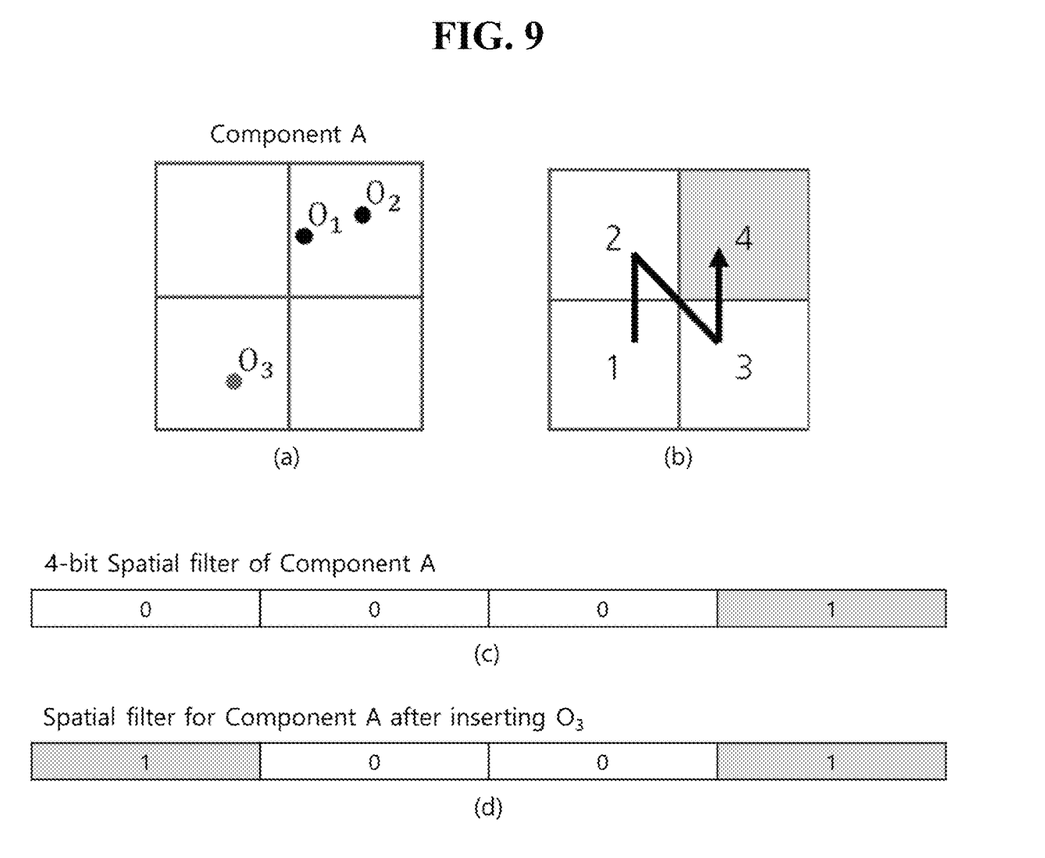
FIG. 9 is a diagram illustrating a component and a spatial filter according to an embodiment of the present disclosure.

Referring to FIG. 9, the spatial filter of the component may be used for reducing I/O costs and quick query processing by eliminating unnecessary component search during query processing. In addition, the spatial filter may be implemented as a bit string indicative of a spatial distribution of data stored in the component. The spatial filter may be created by dividing the area covered by the component into quarters and displaying 1 at a corresponding location when data exists, and 0 when the data does not exist. In FIG. 9(A), when points $O_1$ and $O_2$ are distributed in Component A, the index may be given as shown in FIG. 9(B) by dividing the entire data area into quarters, and the spatial filter may be created as a 4-digit bit string as shown in FIG. 9(C).

In addition, the spatial LSM tree may update the spatial filter when storing new points in each component. For example, when point $O_3$ is stored in Component A, the spatial filter can be updated as shown in FIG. 9(D). In other words, as a result of storing point $O_3$ in Area 1 among the areas covered by Component A (1 to 4 in FIG. 9(B)), the value of the first area of the spatial filter corresponding to Area 1 may be updated from 0 to 1.

Figure 10:
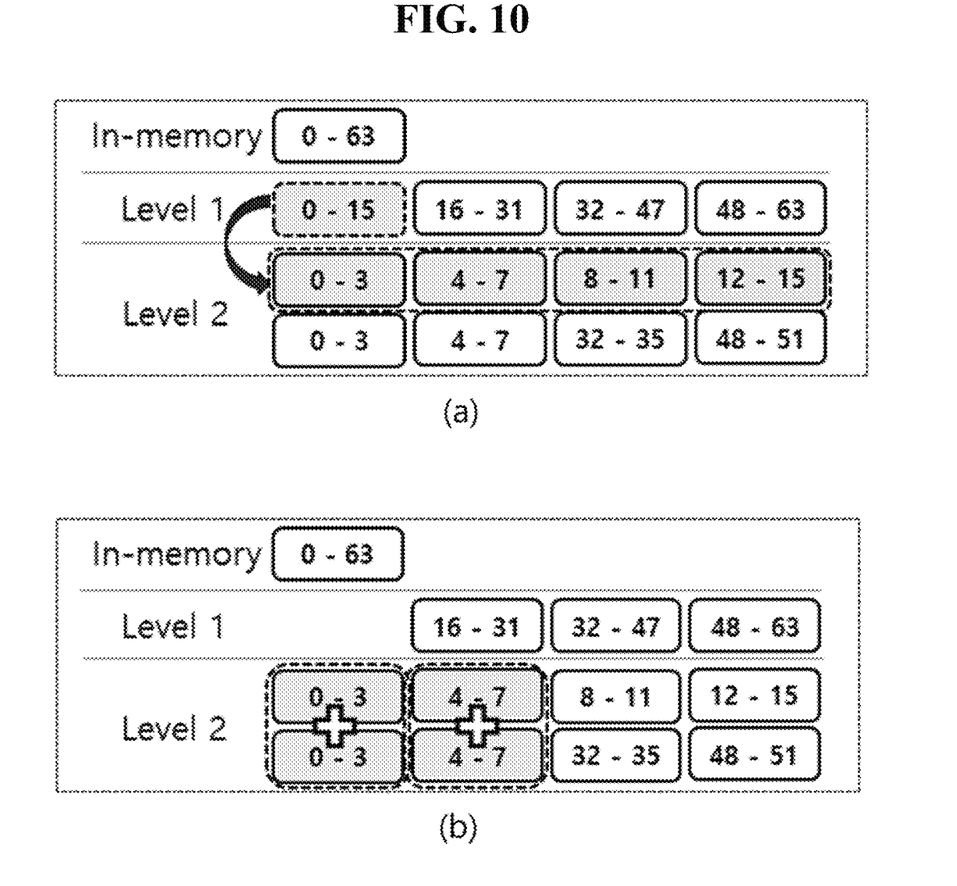
FIG. 10 is a diagram illustrating component flushing and merging according to an embodiment of the present disclosure.

Referring to FIG. 10, whenever a large capacity point data is added to a block in real time in a blockchain environment, the point data in a new block may be indexed into the spatial LSM tree. When the memory component exceeds a threshold value when inserting data, the Z-order based B-Tree in the memory component may be flushed. A flush may be performed in a component unit as shown in FIG. 10(A), and one flush may correspond to an operation of adding the Z-order based B-Tree of the corresponding component to at least one and up to four components of lower level after space division as shown in FIG. 6. Up to a specific level input as a parameter during flushing may be proceeded through the process of dividing the Z-order based B-Tree into 4. However, since there is no increase in components from the subsequent level as shown in FIG. 6, the flushing may be proceeded to the same space in a lower level without space division.

In addition, the spatial filter may be updated to check the data distribution of a newly created or updated component after flushing. However, an increase in the number of components due to flushing may increase the search time of the LSM tree. Accordingly, components having the same key range among components belonging to the same level may be merged into one component. For example, each of the components corresponding to areas 0-3 and 4-7 of the key range of Level 2 in FIG. 10(B) may be merged and updated as one component. In addition, when the size of the merged component exceeds a threshold value after component merging, an additional flush operation may be performed.

The spatial LSM tree apparatus 130 according to an embodiment of the present disclosure may implement a spatial LSM tree that reduces I/O costs when inserting geospatial data in a blockchain environment by reflecting the write-intensive characteristics of the blockchain. In this connection, the memory component and the lower-level component of the spatial LSM tree may have a range in which the space is divided into quarters as the level decreases (or as the level increases), thereby forming a hierarchical structure. In addition, the spatial LSM tree method according to an embodiment of the present disclosure may acquire the data distribution in each component through a spatial filter, and by using the same, it is possible to reduce unnecessary search when processing a query for geospatial data and minimize I/O costs.

Hereinbefore, the present disclosure has been described with reference to the preferred embodiments. However, it will be appreciated by a person having ordinary skill in the pertinent technical field that various modifications and variations may be made without departing from the scope and spirit of the present disclosure as described in the following claims.

DETAILED DESCRIPTION OF MAIN ELEMENTS

100: SPATIAL LSM TREE SYSTEM
110: USER TERMINAL
130: SPATIAL LSM TREE APPARATUS
150: DATABASE
210: PROCESSOR
250: USER INPUT/OUTPUT UNIT
270: NETWORK INPUT/OUTPUT UNIT
310: BLOCKCHAIN
330: MEMORY UNIT
350: DISK UNIT
370: CONTROL UNIT

What is claimed is:

1. A spatial LSM tree apparatus for indexing blockchain based geospatial point data, the apparatus including:
   a blockchain configured of a plurality of data blocks each storing point data distributed over an entire spatial area;
   a memory including a component table storing information about a memory component storing a first index of a most recently stored point data in the blockchain and all components of a spatial LSM tree indexing the point data to cover the entire spatial area; and
   a disk storing a secondary index for the point data in chronological order stored in the blockchain through a plurality of disk components formed in a hierarchical structure among a plurality of levels,
   wherein the memory component and the plurality of disk components configure the spatial LSM tree and each has an independent data storage range and threshold value,
   wherein the component table stores a level and a key range for each disk component of the plurality of disk components,
   wherein the level is a stage in which each disk component of the plurality of disk components exists and the key range corresponds to a range in which each disk component of the plurality of disk components may store point data, and
   wherein a first disk component of the plurality of disk components of a first level has a first key range and a second disk component of the plurality of disk components of a second level has a second key range, the second key range being entirely within a divided portion of the first key range and smaller than the first key range.

2. The apparatus of claim 1, wherein the component table further stores a spatial filter for each component.

3. The apparatus of claim 1, wherein each disk component of the plurality of disk components is implemented as a Z-order-based B-tree that stores a geohash value and a block address for the point data as the secondary index.

4. The apparatus of claim 1, wherein each disk component of the plurality of disk components is spatially divided by a predetermined number and flushed to a lower level of the hierarchical structure when a number of data exceeds the threshold value during a storage process of the point data.

5. The apparatus of claim 4, wherein each disk component of the plurality of disk components is merged with another disk component of the plurality of disk components having a same key range at a corresponding level after the flushing.

6. The apparatus of claim 2, wherein the spatial filter is implemented as a bit string indicative of a spatial distribution of the point data stored in a corresponding component.

7. The apparatus of claim 6, wherein:
   the spatial filter is implemented as a bit string having a length corresponding to a number of divided partial space areas when a spatial area covered by the corresponding component is divided into a plurality of partial space areas; and
   when the point data exists in a specific partial space area, a corresponding bit of the bit string is expressed as 1 or otherwise expressed as 0.

8. A spatial LSM tree method for indexing blockchain based geospatial point data, the method including:
   receiving a plurality of pieces of point data each distributed over an entire spatial area;

creating a new data block storing the plurality of pieces of point data;

adding the new data block to a blockchain and indexing the plurality of pieces of point data into a spatial LSM tree covering the entire spatial area;

flushing to a disk component of a plurality of disk components when a number of data stored in a memory component exceeds a threshold value during the indexing process; and updating a component table based on a result of the flushing, wherein the component table stores a level and a key range for each disk component of the plurality of disk components, wherein the level is a stage in which each disk component of the plurality of disk components exists and the key range corresponds to a range in which each disk component of the plurality of disk components may store point data, and wherein a first disk component of the plurality of disk components of a first level has a first key range and a second disk component of the plurality of disk components of a second level has a second key range, the second key range being entirely within a divided portion of the first key range and smaller than the first key range.

9. The method of claim 8, wherein the indexing includes creating a geohash value and a block address for the point data and storing the geohash value and the block address in a component of the spatial LSM tree.

10. The method of claim 8, wherein the flushing includes spatially dividing a spatial area covered by a component exceeding a threshold value by a predetermined number and then adding the divided spatial area as lower-level components.

11. The method of claim 10, wherein the flushing includes merging corresponding components when components having a same key range exist due to an addition of the lower-level components.

12. The method of claim 10, wherein the flushing includes flushing to a same spatial area of a lower level without the spatial division when a current level of the component is equal to a preset limit level.

13. The method of claim 8, wherein the flushing includes flushing recursively when the number of data stored in the disk component exceeds a threshold value.

14. The method of claim 8, further including:
receiving a range query regarding specific point data;
performing a search on the range query using a spatial filter of the component table; and
creating a response to the range query based on a result of the search.

* * * * *